United States Patent
Seino et al.

(10) Patent No.: US 9,664,163 B2
(45) Date of Patent: May 30, 2017

(54) TERMINAL STRUCTURE OF HIGH-PRESSURE FUEL PIPE FOR DIRECT INJECTION ENGINE

(71) Applicant: USUI KOKUSAI SANGYO KAISHA LTD., Shimizu-cho, Sunto-gun, Shizuoka (JP)

(72) Inventors: Iichiro Seino, Shimizu-cho (JP); Eiji Kurata, Shimizu-cho (JP)

(73) Assignee: USUI KOKUSAI SANGYO KAISHA LIMITED (JP)

( * ) Notice: Subject to any disclaimer, the term of this patent is extended or adjusted under 35 U.S.C. 154(b) by 0 days.

(21) Appl. No.: 14/996,285

(22) Filed: Jan. 15, 2016

(65) Prior Publication Data

US 2016/0123287 A1 May 5, 2016

Related U.S. Application Data

(62) Division of application No. 14/380,512, filed as application No. PCT/JP2013/052869 on Feb. 7, 2013.

(30) Foreign Application Priority Data

Feb. 28, 2012 (JP) .................................. 2012-042529

(51) Int. Cl.
  *F02M 55/00* (2006.01)
  *F16L 13/08* (2006.01)
  (Continued)

(52) U.S. Cl.
  CPC .......... *F02M 55/005* (2013.01); *F02M 55/02* (2013.01); *F16L 13/08* (2013.01);
  (Continued)

(58) Field of Classification Search
  CPC ................. F02M 55/02; F02M 55/005; F02M 2200/858; F02M 61/168;
  (Continued)

(56) References Cited

U.S. PATENT DOCUMENTS 5,022,372 A 6/1991 Imura et al.
6,082,333 A 7/2000 Vattelana et al.
(Continued)

FOREIGN PATENT DOCUMENTS

IE 10 2005 045 731 A 4/2007
JP 1-136674 9/1989
(Continued)

OTHER PUBLICATIONS

Japanese International Search Report dated May 7, 2013.
Chinese Office Action Dated Dec. 30, 2015.

*Primary Examiner* — Long T Tran
(74) *Attorney, Agent, or Firm* — Gerald E. Hespos; Michael J. Porco; Matthew T. Hespos

(57) ABSTRACT

Provided is a terminal structure of a high-pressure fuel pipe for a direct injection engine which can prevent stress concentration to a brazed portion between a pipe and a connection part effectively. In the terminal structure of a high-pressure fuel pipe for a direct injection engine where a connection head is brazed to an end of a fuel pipe, the end of the fuel pipe continued to a fuel pipe insertion portion of the connection head is provided with a drawn portion, an outer diameter D1 of the drawn portion to a fuel pipe diameter D satisfies 0.8D≤D1≤0.9D, and a length L1 of the drawn portion having the outer diameter D1 in a pipe-axial direction from an end of the fuel pipe insertion portion satisfies L1≥0.06D.

2 Claims, 3 Drawing Sheets

(51) Int. Cl.
*F02M 55/02* (2006.01)
*F16L 13/02* (2006.01)
*F16L 41/08* (2006.01)

(52) U.S. Cl.
CPC ...... *F02M 2200/90* (2013.01); *F16L 13/0209* (2013.01); *F16L 41/084* (2013.01)

(58) Field of Classification Search
CPC ... F02M 2200/8061; F02M 2200/8084; F02M 37/0017; F02M 51/0682; F02M 2200/85; F02M 51/0678; F16L 13/0209; F16L 13/08; F16L 41/084; F16L 19/061
See application file for complete search history.

(56) References Cited

U.S. PATENT DOCUMENTS

| | | | |
|---|---|---|---|
| 6,186,121 B1 | 2/2001 | Uematsu | |
| 6,415,768 B1 * | 7/2002 | Usui | F02M 55/02 |
| | | | 123/468 |
| 6,840,283 B2 * | 1/2005 | Furugen | F02M 55/005 |
| | | | 123/468 |
| 7,275,521 B2 * | 10/2007 | Usui | F02M 55/005 |
| | | | 123/468 |
| 7,735,473 B2 * | 6/2010 | Kato | F02M 55/005 |
| | | | 123/468 |
| 7,959,468 B2 * | 6/2011 | Yong | H01R 9/038 |
| | | | 439/607.41 |
| 8,186,724 B2 * | 5/2012 | Kato | F02M 55/005 |
| | | | 285/247 |
| 2004/0094127 A1 | 5/2004 | Watanabe | |
| 2009/0139595 A1 * | 6/2009 | Kato | F02M 55/005 |
| | | | 138/109 |
| 2010/0019494 A1 | 1/2010 | Martin | |
| 2012/0216586 A1 * | 8/2012 | Sims, Jr. | F16L 27/047 |
| | | | 72/47 |
| 2013/0257041 A1 * | 10/2013 | Peirce | F16L 33/223 |
| | | | 285/247 |

FOREIGN PATENT DOCUMENTS

| | | |
|---|---|---|
| JP | 4-347091 | 12/1992 |
| JP | 2007-309232 | 11/2007 |

* cited by examiner

TERMINAL STRUCTURE OF HIGH-PRESSURE FUEL PIPE FOR DIRECT INJECTION ENGINE

The present application is a divisional application of U.S. patent application Ser. No. 14/380,512, filed Aug. 22, 2014, the contents of which are hereby incorporated by reference in their entirety.

BACKGROUND OF THE INVENTION

1. Field of the Invention

The present invention relates to one used in a high-pressure fuel passage connecting between a high-pressure fuel pump and a fuel rail in a fuel supplying apparatus for a direct injection engine, and more specifically relates to a terminal structure of a high-pressure fuel pipe for a direct injection engine where a connection head is brazed to an end of a fuel pipe composed of a steel pipe or a stainless steel pipe.

2. Description of the Related Art

As a conventional terminal structure of a high-pressure fuel pipe for a direct injection engine, there is generally one where a connection head having a spherical or a curved-face pressing seat face and a fuel pipe insertion portion positioned on the opposite side of the pressing seat face is brazed to an end of a fuel pipe composed of a steel pipe or a stainless steel pipe.

FIG. 5 shows an example of the terminal structure of a high-pressure fuel pipe for a direct injection engine, and one where a connection head 22 having a spherical or a curved-face pressing seat face 22-1 at a distal end thereof and a fuel pipe insertion portion 22-2 (generally called "hakama (skirt)" in Japan) for securing a brazing area on the opposite side of the pressing seat face has been brazed to an end of a fuel pipe 21 composed of a steel pipe or a stainless pipe is known (see DE 10 2005 045 731 A1). That is, such a terminal structure of a high-pressure fuel pipe for a direct injection engine is configured by fitting the fuel pipe insertion portion 22-2 of the connection head 22 having a spherical or a curved-face pressing seat face 22-1 at a distal end thereof and the fuel pipe insertion portion 22-2 formed on the opposite side of the pressing seat face to a straight pipe portion at the end of the fuel pipe 21 composed of a steel pipe or a stainless steel pipe and brazing the fitted portion.

Further, FIG. 6 shows an example of a terminal structure of an eye joint used for a high-pressure fuel pipe for a direct injection engine, where an eye joint main body (corresponding to the above "connection head") 24 having an annular recessed groove 24-1 internally, having a wall portion 24-2 positioned on the side of a circumferential side of the annular recessed groove 24-1 and bulged in an arc shape, having a connection hole 24-3 communicating with the annular recessed groove 24-1 and a mounting hole 24-4 bored at an axial core portion, and having a short cylindrical wall (corresponding to the above "hakama") 24-5 formed by integrally protruding a hole peripheral wall of the connection hole 24-3 outward and having an inner diameter smaller than a diameter of the fuel pipe 23 has been brazed to an end of a fuel pipe 23 composed of a steel pipe or a stainless steel pipe, and this eye joint is configured by performing one-stage drawing work to the connection end of the fuel pipe 23, fitting the drawn portion into the short cylindrical wall 24-5 of the eye joint main body and brazing the fitted portion (see Japanese Patent Application Laid-Open No. H1992-347091).

However, such conventional terminal structures of a high-pressure fuel pipe for a direct injection engine and of the eye joint used for a high-pressure fuel pipe for a direct injection engine have the following problems described below.

In the case of the terminal structure of a high-pressure fuel pipe for a direct injection engine shown in FIG. 5, by providing the fuel pipe insertion portion (hakama) 22-2 for securing a brazing area on the opposite side of the pressing seat face 22-1 of the connection head 22, such an effect that enables to secure a sufficient brazing area and thereby a brazing strength to the connection head 22 to improve can be achieved; however, since the straight pipe portion of the end of the fuel pipe 21 is fitted to the fuel pipe insertion portion (hakama) 22-2 of the connection head 22 to be brazed, a thinner pipe must be adopted as the fuel pipe 21, which results in such a problem that an inner volume cannot be secured sufficiently and requirements cannot be satisfied regarding such a performance aspect as pulsation or pressure loss.

Further, in the terminal structure of an eye joint used for a high-pressure fuel pipe for a direct injection engine shown in FIG. 6, since the eye joint is configured by performing one-stage drawing work to the straight pipe portion at the end of the fuel pipe 23 to reduce a diameter of the straight pipe portion, fitting the reduced-diameter pipe portion into the short cylindrical wall 24-5 of the eye joint main body 24, and brazing the fitted portion, there is such a problem that stress is concentrated to the drawn portion of the terminal portion of the fuel pipe 23 in the vicinity of the short cylindrical wall 24-5 and a possibility that the fuel pipe 23 is broken from the drawn portion becomes large.

The present invention has been made in order to solve such conventional problems, and an object thereof is to propose a terminal structure of a high-pressure fuel pipe for a direct injection engine which not only can improve the brazing strength to the connection head but also can prevent stress concentration to the brazed portion with the connection head effectively even if a thin-diameter pipe is adopted as the fuel pipe and drawing work has been applied to an end of the pipe in view of the problem of pulsation or an internal volume, the performance aspect, or the like.

SUMMARY OF THE INVENTION

A terminal structure of a high-pressure fuel pipe for a direct injection engine according to the present invention is one of a high-pressure fuel pipe for a direct injection engine where a connection head is brazed to an end of a fuel pipe composed of a steel pipe or a stainless pipe, the connection head having a spherical or a curved-face pressing seat face at a distal end thereof and a fuel pipe insertion portion on the opposite side of the pressing seat face; wherein the end of the fuel pipe continued to the fuel pipe insertion portion of the connection head is provided with a one-stage drawn portion, an outer diameter D1 of the drawn portion relative to a fuel pipe diameter D satisfying $0.8\ D \leq D1 \leq 0.9\ D$; and wherein a length L1 of the drawn portion having the outer diameter D1 from an end of the fuel pipe insertion portion in an axial direction of the pipe satisfies $L1 \geq 0.06\ D$.

Further, another terminal structure of a high-pressure fuel pipe for a direct injection engine according to the present invention is one of a high-pressure fuel pipe for a direct injection engine, where a connection head is brazed to an end of a fuel pipe composed of a steel pipe or a stainless pipe, the connection head having a spherical or a curved-face pressing seat face at a distal end thereof and a fuel pipe insertion portion on the opposite side of the pressing seat face; wherein the end of the fuel pipe continued to the fuel pipe insertion portion of the connection head has a two-stage drawn portion, an outer diameter D1 of a first-stage drawn portion located on the side of the connection head, relative to a fuel pipe diameter D, satisfying 0.8≤D1≤0.9 D; wherein a length L1 of the first-stage drawn portion having the outer diameter D1 from an end of the fuel pipe insertion portion in an axial direction of the pipe satisfies L1≥0.06 D; and wherein a second-stage drawn portion continued to the first-stage drawn portion has a straight pipe portion having an outer diameter D2 larger than the outer diameter D1 of the first-stage drawn portion.

Additionally, the present invention includes a preferred aspect where a linear length L2 in the axial direction of the pipe from a terminal end, on the opposite side to the connection head, of the length L1 of the drawn portion having the outer diameter D1 in the axial direction of the pipe, to a drawing-termination end, is 0.14 D or more, and an entire length (L1+L2) of the drawn portion of the pipe is 1.5 D or less.

The present invention is the terminal structure of a high-pressure fuel pipe for a direct injection engine where a connection head having a spherical or a curved-face pressing seat face at a distal end of the connection head and a fuel pipe insertion portion on the opposite side of the pressing seat face is brazed to an end of a fuel pipe composed of a steel pipe or a stainless pipe, wherein a one-stage drawn portion is formed at the end of the fuel pipe continued to the fuel pipe insertion portion of the connection head; an outer diameter D1 of the drawn portion to a fuel pipe diameter D satisfies 0.8≤D1≤0.9 D; and a length L1 of the drawn portion having the outer diameter D1 in an axial direction of the pipe from an end of the fuel pipe insertion portion has a straight pipe portion satisfying L1 0.06 D, and at the result, stress concentration to a brazed portion with the connection head can be prevented effectively. Further, in another terminal structure where a two-stage drawn portion is formed at the end of the fuel pipe continued to the fuel pipe insertion portion of the connection head, a first-stage drawn portion located on the side of the connection head has an outer diameter D1 to a fuel pipe diameter D satisfying 0.8≤D1≤0.9 D in a similar manner as the above; a straight pipe portion satisfying a condition where a length L1 of the first-stage drawn portion having the outer diameter D1 in an axial direction of the pipe from an end of the fuel pipe insertion portion has a straight pipe portion satisfying L1≥0.06 D; and a second-stage drawn portion continued to the first-stage drawn portion has a straight pipe portion having an outer diameter D2 larger than the outer diameter D1 of the first-stage drawn portion, and at the result, a dispersion effect of stress acting on the fuel pipe can be obtained, so that even if a load (displacement) in a bending direction to the high-pressure fuel pipe occurs, stress concentration is avoided and the problem of breaking of a fuel pipe is almost solved.

DETAILED DESCRIPTION OF THE PREFERRED EMBODIMENTS

In the present invention, a fuel pipe 1, 11 is composed of a steel pipe or a stainless steel pipe made of carbon steel for a high-pressure pipe or austenite stainless steel or the like which has been cut to a predetermined size and having an outer diameter D in a range from Φ6 mm to Φ10 mm and t/D (t: thickness, D: pipe outer diameter) in a range from 0.1 to 0.2. Further, as such steel pipe made of carbon steel for a high-pressure pipe or such stainless steel pipe made of austenite stainless steel, an electric-resistance welded steel pipe, a semi-seamless pipe, a seamless pipe, or the like can be used. Incidentally, when the steel pipe made of carbon steel is used, Ni, Zn, Sn or an alloy based upon these metals is generally provided on an inner face and/or an outer face of the steel pipe for corrosion protection.

Figure 1:
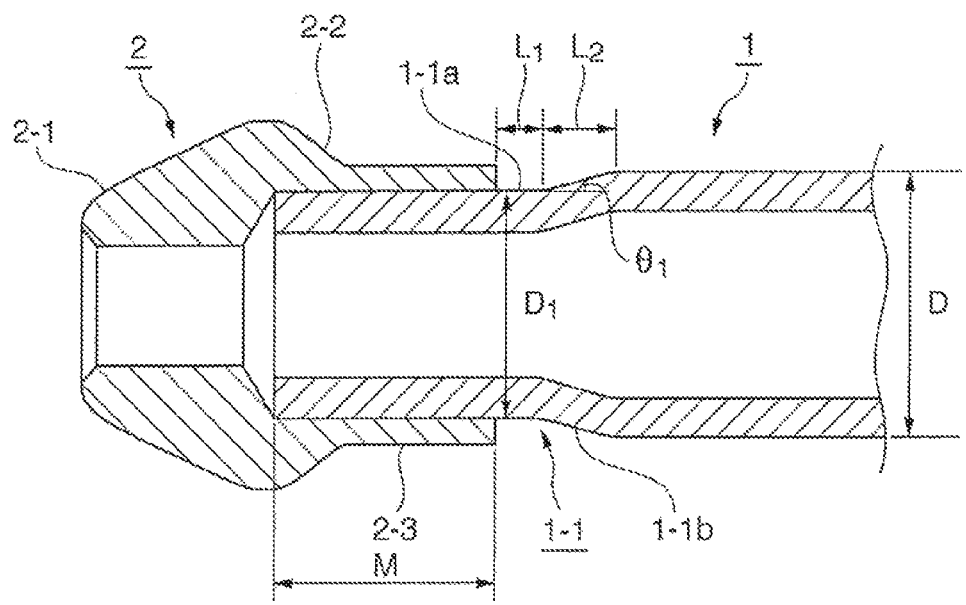
FIG. 1 is a sectional view showing an example of a terminal structure of a high-pressure fuel pipe for a direction injection engine according to the present invention.
Figure 2:
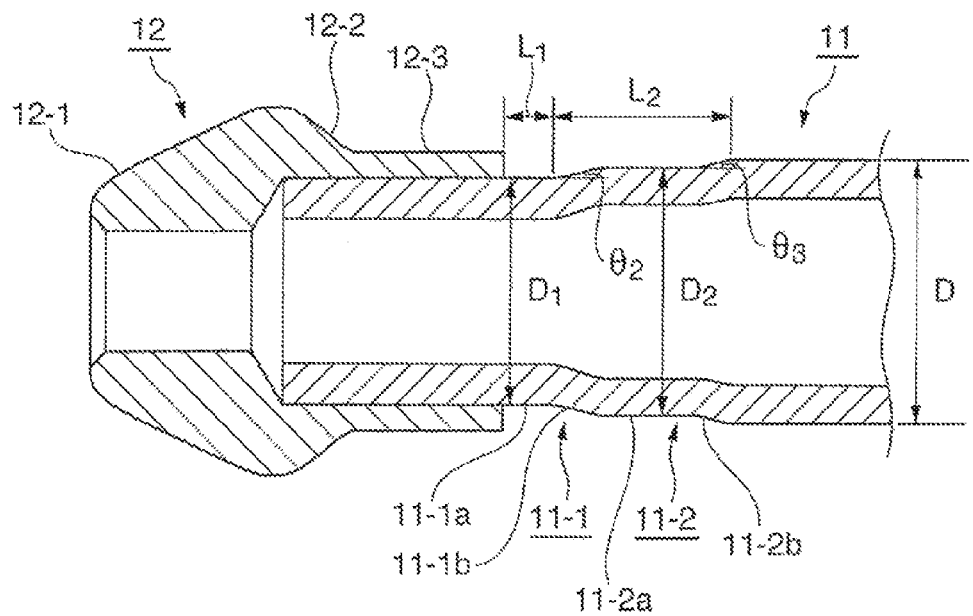
FIG. 2 is a sectional view showing another example of the terminal structure of a high-pressure fuel pipe for a direction injection engine like the above.

As shown in FIG. 1 and FIG. 2, a connection head 2, 12 in a terminal structure of a high-pressure fuel pipe for a direct injection engine according to the present invention has a spherical, curved-face or conical pressing seat face 2-1, 12-1 at an end of the connection head on the connection side, a nut pressure-receiving face 2-2, 12-2 continued to the pressing seat face 2-1, 12-1, and a fuel pipe insertion portion (hakama) 2-3, 12-3 continued to the nut pressure-receiving face 2-2, 12-2 which are obtained by plastic working or cutting work.

The terminal structure of a high-pressure fuel pipe for a direct injection engine according to the present invention shown in FIG. 1 is characterized by having a constituent feature that a straight pipe portion 1-1a is provided at a first-stage drawn portion 1-1 formed at the end of the fuel pipe continued to the fuel pipe insertion portion 2-3 of the connection head 2 by press forming.

Particularly, the terminal structure of the present invention is characterized in that an outer diameter D1 of the first-stage drawn portion 1-1 relative to a fuel pipe diameter D satisfies 0.8≤D1≤0.9 D; a length L1 of the drawn portion 1-1 having the outer diameter D1 in an axial direction of the pipe from an end of the fuel pipe insertion portion 2-3 has a straight pipe portion 1-1a satisfying L1≥0.06 D ; a linear length L2 in the axial direction of the pipe from a terminal end of the straight pipe portion 1-1a on the opposite side to the connection head 2, to a drawing-work terminal end, is 0.14 D or more; and an entire length (L1+L2) of the first-stage drawn portion 1-1 is 1.5 D or less.

Here, the reason why the length L1 of the first-stage drawn portion 1-1 in the axial direction is determined to be 0.06 D or more is because when the length L1 is less than 0.06 D, stress is concentrated on a brazed portion. Further, the reason why the entire length (L1+L2) of the first-stage drawn portion 1-1 is limited to 1.5 D or less is because when the entire length (L1+L2) exceeds 1.5 D, pressure loss of two or more times that in the case that the drawing work has not be performed occurs.

An angle θ1 of a first-stage tapered pipe portion 1-1b can be set appropriately according to the entire length (L1+L2) of the first-stage drawn portion 1-1.

According to a terminal structure of a high-pressure fuel pipe for a direct injection engine of the present invention shown in FIG. 1, the outer diameter D1 of the first-stage drawn portion 1-1 formed at the pipe end by press working to a fuel pipe diameter D satisfies $0.8 \leq D1 \leq 0.9$ D; a connection head 2 is fitted on the end of the fuel pipe 1; and the fitted portion is brazed, the connection head 2 having the spherical, curved-face or conical pressing seat face 2-1 at the connection-side end of the connection head, a nut pressure-receiving face 2-2 continued to the pressing seat face 2-1, and a fuel pipe insertion portion (hakama) 2-3 continued to the nut pressure-receiving face 2-2 which are formed by plastic working or cutting work, and the end of the fuel pipe 1 being provided with the first-stage drawn portion 1-1 having the straight pipe portion 1-1a satisfying the condition that the length L1 of the first-stage drawn portion 1-1 having the outer diameter D1 in the pipe-axial direction from the end of the fuel pipe insertion portion is $L1 \geq 0.06$ D.

The case of the above-described terminal structure of a high-pressure fuel pipe for a direct injection engine shown in FIG. 1 can prevent stress concentration to the brazed portion between the fuel pipe 1 and the connection head 2 effectively by working of the straight pipe portion 1-1a satisfying the condition that the length L1 of the first-stage drawn portion 1-1 having the outer diameter D1 in the pipe-axial direction from the end of the fuel pipe insertion portion satisfies $L1 \geq 0.06$ D.

Further, the terminal structure of a high-pressure fuel pipe for a direct injection engine of the present invention shown in FIG. 2 is characterized by having a constituent feature that a drawn portion is formed on the end of the fuel pipe continued to the fuel pipe insertion portion 2-3 of the connection head 2 in a two-stage fashion. Particularly, the present invention is a terminal structure where an outer diameter D1 of a first-stage drawn portion 11-1 to a fuel pipe diameter D satisfies $0.8 \leq D1 \leq 0.9$ D; a connection head 12 is fitted on the end of the fuel pipe 11; and the fitted portion is brazed, the connection head 12 having the spherical, curved-face or conical pressing seat face 12-1 at the connection-side end of the connection head, the nut pressure-receiving face 12-2 continued to the pressing seat face 12-1, and the fuel pipe insertion portion (hakama) 12-3 continued to the nut pressure-receiving face 12-2 which are formed by plastic working or cutting work, and the end of the fuel pipe 1 being provided with the first-stage drawn portion 11-1 having a straight pipe portion 11-1a satisfying the condition where a length L1 of the first-stage drawn portion 1-1 having the diameter D1 in a pipe-axial direction from the end of the fuel pipe insertion portion satisfies $L1 \geq 0.06$ D and a second-stage drawn portion 11-2 continued to the first-stage drawn portion 11-1 and having a straight pipe portion 11-2a having an outer diameter D2 larger than the outer diameter D1 of the first-stage drawn portion 11-1.

Even in the case of the terminal structure of a high-pressure fuel pipe for a direct injection engine where the drawn portion have been formed in the fuel pipe end in a two-staged fashion, shown in FIG. 2, respective angles θ2, θ3 of a first-stage tapered pipe portion 11-1b and a second-stage tapered pipe portion 11-2b in a linear length L2 in the pipe-axial direction including the second-stage drawn portion 11-2 from an end of the first-stage straight pipe portion 11-1a on the opposite side to the connection head 12 to a drawing termination end, corresponding to the linear length L2 in the pipe-axial direction from the terminal end, opposite to the connection head 2, of the straight pipe portion 1-1a of the terminal structure shown in FIG. 1 to a drawing termination end can be set appropriately in response to the entire length (L1+L2) of the drawn portion 11-1.

In the case of the terminal structure of a high-pressure fuel pipe for a direct injection engine shown in FIG. 2, in the terminal structure where the outer diameter D1 to the fuel pipe diameter D satisfies $0.8 \leq D1 \leq 0.9$ D, stress concentration to the brazed portion with the connection head 12 can be not only prevented effectively by working of the first-stage drawn portion 11-1 having the straight pipe portion 11-1a satisfying the condition where the length L1 of the first-stage drawn portion 11-1 having the outer diameter D1 in the pipe-axial direction from the end of the fuel pipe insertion portion is $L1 \geq 0.06$ D but also an dispersion effect of stress acting on the fuel pipe 11 can be obtained by working of the second-stage drawing portion 11-2, so that even if a load (displacement) in a bending direction to the high-pressure fuel pipe 11 occurs, stress concentration is avoided and a problem of damage of the fuel pipe 11 is almost all solved.

EXAMPLES

The present invention will be specifically described below based upon Examples. However, the present invention is not restricted by the following Examples and it can be modified in design arbitrarily within the scope of the gist of the present invention.

Example 1

A terminal structure of a high-pressure fuel pipe for a direct injection engine shown in FIG. 1 was manufactured and a reduction effect of stress concentration to a brazed portion between a fuel pipe and a connection head was examined.

In this Example, a stainless steel pipe made of austenitic stainless steel and having an outer diameter D of Φ8 mm and t/D (t: thickness, D: pipe outer diameter) of 0.15 was used as the fuel pipe, and a connection head made of stainless steel and having a conical pressing seat face at the connection-side end of the connection head, a nut pressure-receiving face continued to the pressing seat face, and a fuel pipe insertion portion (brazing length M=7 mm) continued to the nut pressure-receiving face which were obtained by plastic working was brazed to an end of the fuel pipe 1 having a first-stage drawn portion having D1=7 mm (constant), L1=0 to 4 mm, and an outer diameter ratio=0 to 0.5. A bending stress, L1, and the outer diameter in this Example are shown in Table 1 and a relationship between the bending stress and the outer diameter ratio is shown in FIG. 3.

Figure 3:
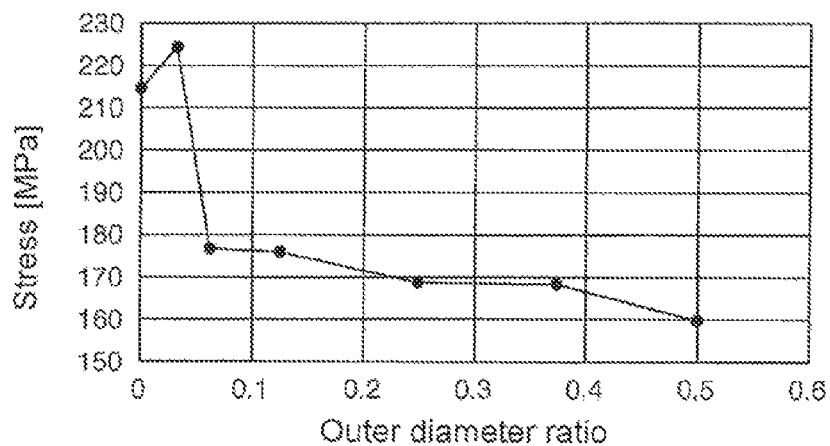
FIG. 3 is a graph showing a relationship between a bending stress and an outer diameter ratio in Example 1 of the present invention.

From data shown in Table 1 and FIG. 3, it is understood that a change of the bending stress is made small by providing the straight pipe portion satisfying the condition where the length L1 of the first-stage drawn portion having the outer diameter D1 in the pipe-axial direction from the fuel pipe insertion portion terminal satisfies $L1 \geq 0.06$ D. This result supports that when the straight pipe portion satisfying the condition of $L1 \geq 0.06$ D is provided in the first-stage drawn portion, stress concentration to the brazed portion between the fuel pipe and the connection head can be prevented effectively.

TABLE 1

|  | L1 (mm) | Outer Diameter Ratio | Bending Stress (MPa) |
|---|---|---|---|
| Comparative Example | 0 | 0 | 214.22 |
| Present Invention | 0.25 | 0.03 | 223.82 |
|  | 0.5 | 0.06 | 176.13 |
|  | 1 | 0.13 | 175.68 |
|  | 2 | 0.25 | 168.61 |
|  | 3 | 0.38 | 167.82 |
|  | 4 | 0.50 | 159.39 |

Example 2

A terminal structure of a high-pressure fuel pipe for a direct injection engine shown in FIG. 1 and similar to Example 1 was manufactured and a change of pressure loss due to drawing length (L1+L2) was examined.

In this Example, a stainless steel pipe made of austenitic stainless steel material was used as the fuel pipe 1, and a connection head made of stainless steel and having a conical pressing seat face at the connection-side end of the connection head, a nut pressure-receiving face continued to the pressing seat face, and a fuel pipe insertion portion (brazing length M=7 mm) continued to the nut pressure-receiving face which were obtained by plastic working was brazed to an end of a fuel pipe 1 having a first-stage drawn portion where the outer diameter D and the outer diameter D1 of the straight pipe portion of the first-stage drawn portion are D=Φ6.0 to Φ10.0 mm and D1=4.8 to 8.0 mm, respectively. A relationship between increase of pressure loss ΔP and the entire length (L1+L2) of the pipe-drawn portion is shown in FIG. 4.

Figure 4:
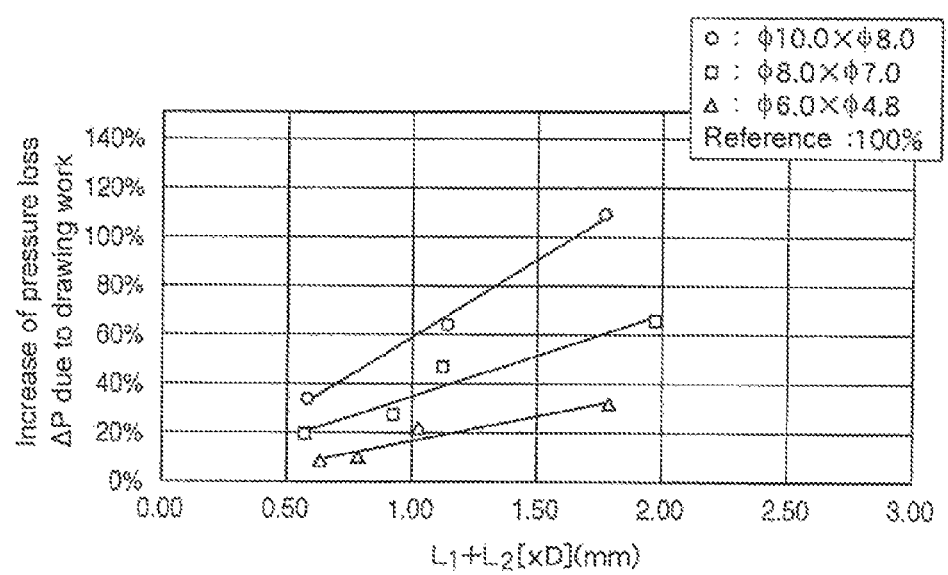
FIG. 4 is a graph showing a relationship between increase of pressure loss AP due to drawing and an entire length (L1+L2) of a pipe-drawn portion, in Example 2 of the present invention.
Figure 5:
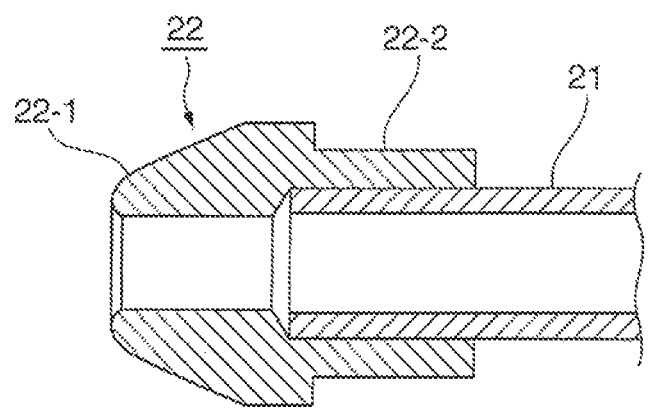
FIG. 5 is a sectional view showing one example of a conventional terminal structure of a high-pressure fuel pipe for a direction injection engine.
Figure 6:
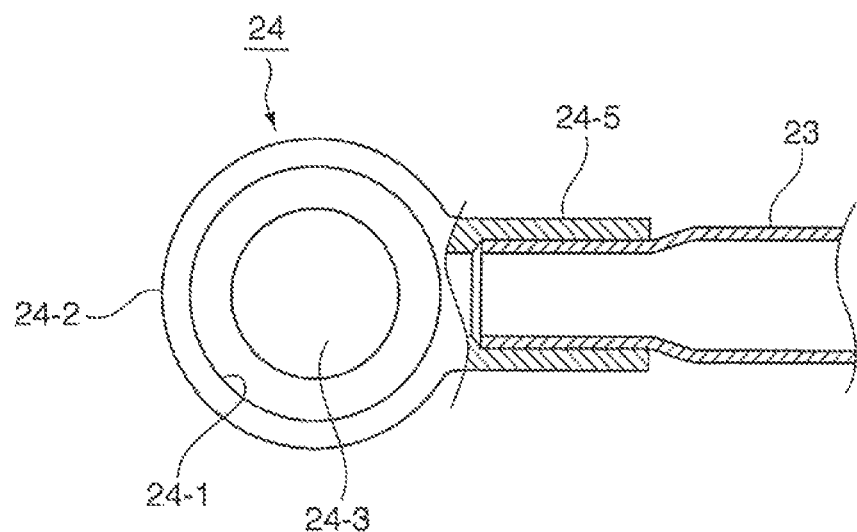
FIG. 6 is a sectional view showing one example of a terminal structure of an eye joint used in a conventional terminal structure of a high-pressure fuel pipe for a direction injection engine in a partially broken fashion.

As is apparent from data shown in FIG. 4, when the drawing length (L1+L2) is determined based upon that the increase of pressure loss due to drawing the pipe end of the fuel pipe is 100% or less (double in loss) according to calculation of the pressure loss ΔP, (L1+L2)≤1/5 D is obtained. Accordingly, the entire length (L1+L2) of the first-stage drawn portion 1-1 was determined as 1.5 D or less in the present invention.

Example 3

A terminal structure (two-stage drawing) of a high-pressure fuel pipe for a direct injection engine shown in FIG. 2 was manufactured and a reduction effect of stress concentration to a brazed portion between a fuel pipe and a connection head was examined.

In this Example, a stainless steel pipe made of austenitic stainless steel and having an outer diameter D of Φ8 mm and t/D (t: thickness, D: pipe outer diameter) of 0.15 was used as the fuel pipe, and a connection head made of stainless steel and having a conical pressing seat face at the connection-side end of the connection head, a nut pressure-receiving face continued to the pressing seat face, and a fuel pipe insertion portion (brazing length M=7 mm) continued to the nut pressure-receiving face which were obtained by plastic working was brazed to an end of a fuel pipe having a two-stage drawn portion with D1=7 mm, D2=7.5 mm, L1=1 mm, and L2=6 mm in the same manner as Examples 1 and 2.

As the result of examination of the reduction effect of the stress concentration corresponding to the brazed portion between the fuel pipe and the connection head to the terminal structure manufactured, it has been found that a dispersion effect of stress acting on the fuel pipe is obtained by working of the second-stage drawn portion in addition to working of the first-stage drawn portion, so that even if a load (displacement) in a bending direction to the high-pressure fuel pipe occurs, stress concentration can be avoided.

The present invention can prevent stress concentration to a brazed portion with a connection head effectively by, in a terminal structure of a high-pressure fuel pipe for a direct injection engine where a connection head having a spherical or a curved-face pressing seat face at a distal end thereof and a fuel pipe insertion portion on an opposite side of the pressing seat face is brazed to an end of a fuel pipe composed of a steel pipe or a stainless steel pipe, providing a one-stage drawn portion having a straight pipe portion satisfying a specific condition at an end of a fuel pipe continued to the fuel pipe insertion portion of the connection head, and a dispersion effect of stress acting on a fuel pipe can be further obtained by providing a second-stage drawn portion continued to the one-stage drawn portion, so that even if a load (displacement) in a bending direction to the high-pressure fuel pipe occurs, stress concentration is avoided, and large contribution to reduction of risk of a fuel pipe for a direct injection engine is obtained.

REFERENCE SIGNS LIST 1, 11 . . . high-pressure fuel pipe,
1-1, 11-1 . . . first-stage drawn portion
1-1a, 11-1a, 11-2a . . . straight pipe portion
1-1b, 11-1b, 11-2b . . . tapered pipe portion
2, 12 . . . connection head
2-1, 12-1 . . . pressing seat face
2-2, 12-2 . . . nut-pressure receiving face,
2-3, 12-3 . . . fuel pipe insertion portion (hakama)
11-2 . . . second-stage drawn portion
θ1, θ2, θ3 . . . angle of tapered pipe portion

What is claim is:

1. A terminal structure of a high-pressure fuel pipe for a direct injection engine, comprising a connection head brazed to an end of a steel or stainless steel fuel pipe, the connection head having a spherical or a curved-face pressing seat face at a distal end thereof and a fuel pipe insertion portion on an end opposite of the pressing seat face, wherein the end of the fuel pipe continued from the fuel pipe insertion portion of the connection head has a two-stage drawn portion, an outer diameter D1 of a first-stage drawn portion located on the side of the connection head, relative to a fuel pipe diameter D, satisfying 0.8≤D1≤0.9 D, wherein a length L1 of the first-stage drawn portion having the outer diameter D1 from an end of the fuel pipe insertion portion in an axial direction of the pipe satisfies L1≥0.06 D, and
    wherein a second-stage drawn portion continued from the first-stage drawn portion has a straight pipe portion having an outer diameter D2 larger than the outer diameter D1 of the first-stage drawn portion.

2. The terminal structure of a high-pressure fuel pipe for a direct injection engine according to claim 1, wherein a linear length L2 in the axial direction of the pipe from a terminal end of the length L1 of the drawn portion having the outer diameter D1 in the axial direction of the pipe, to a drawing-termination end, is 0.14 D or more, and an entire length (L1+L2) of the drawn portion of the pipe is 1.5 D or less.

* * * * *